July 22, 1952 F. J. MALNAR 2,604,019
ATTACHMENT FOR MILLING MACHINES
Filed Dec. 7, 1946 3 Sheets-Sheet 2

INVENTOR.
FRANK J. MALNAR.
BY
ATTORNEYS.

July 22, 1952            F. J. MALNAR            2,604,019
ATTACHMENT FOR MILLING MACHINES
Filed Dec. 7, 1946            3 Sheets-Sheet 3
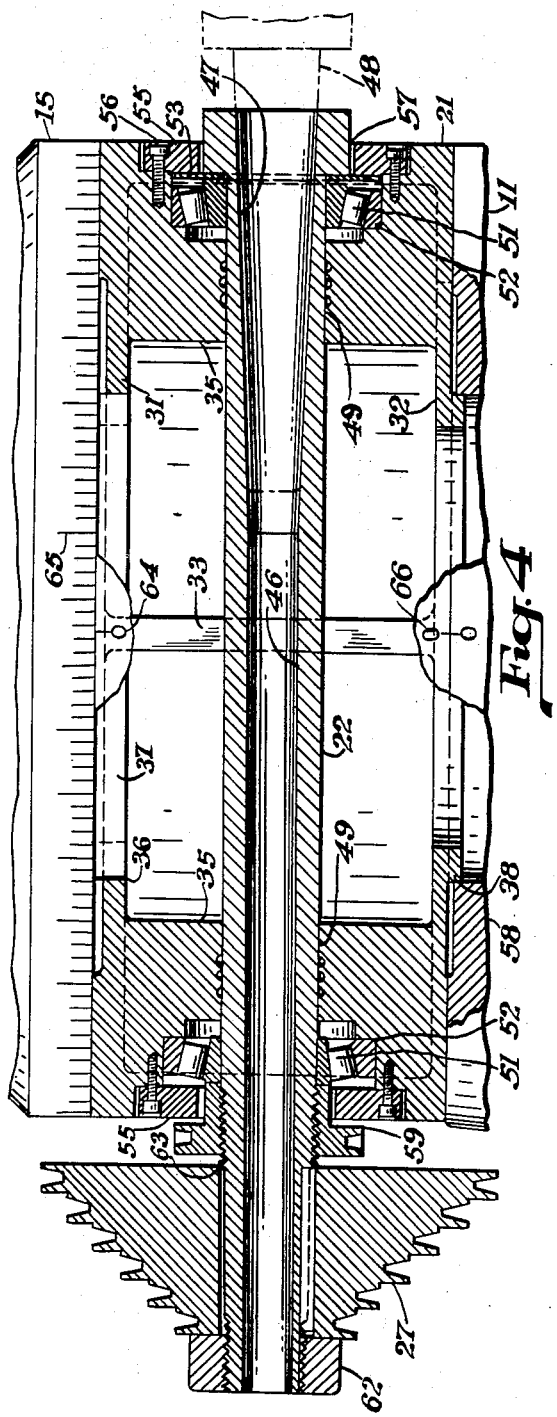
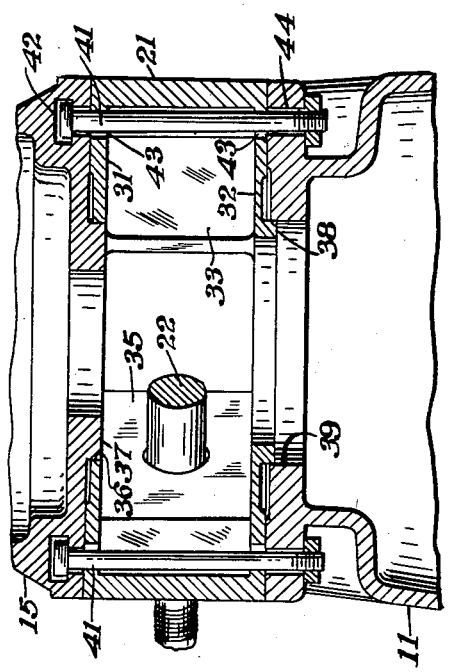
INVENTOR.
FRANK J. MALNAR.
BY *Richey & Watts*
ATTORNEYS.

Patented July 22, 1952

2,604,019

UNITED STATES PATENT OFFICE 2,604,019

ATTACHMENT FOR MILLING MACHINES

Frank J. Malnar, Euclid, Ohio, assignor to The Malnar Machine & Tool Company, Inc., Cleveland, Ohio, a corporation of Ohio Application December 7, 1946, Serial No. 714,836

3 Claims. (Cl. 90—17)

This invention pertains to machine tools and more specifically to an improvement in vertical milling machines.

An object of the invention is to provide a horizontal spindle milling attachment for use with vertical milling machines.

A further object of the invention is to provide a horizontal spindle for use in combination with vertical-spindle milling machines which may be readily incorporated into the vertical machine.

Another object of the invention is to provide an auxiliary spindle in a bolster block or raising block which may be interposed between the column and spindle head of a vertical milling machine.

Other objects and advantages more or less ancillary to the foregoing and the manner in which all the various objects are realized will appear in the following description, which, considered in connection with the accompanying drawings, sets forth the preferred embodiment of the invention.

Referring to the drawings,

Fig. 4 is a partial vertical section of the invention taken on the plane indicated by the line 4—4 in Fig. 3; and Fig. 5 is a partial vertical section of the milling machine taken on the plane indicated by the line 5—5 in Fig. 2.

Figure 1:
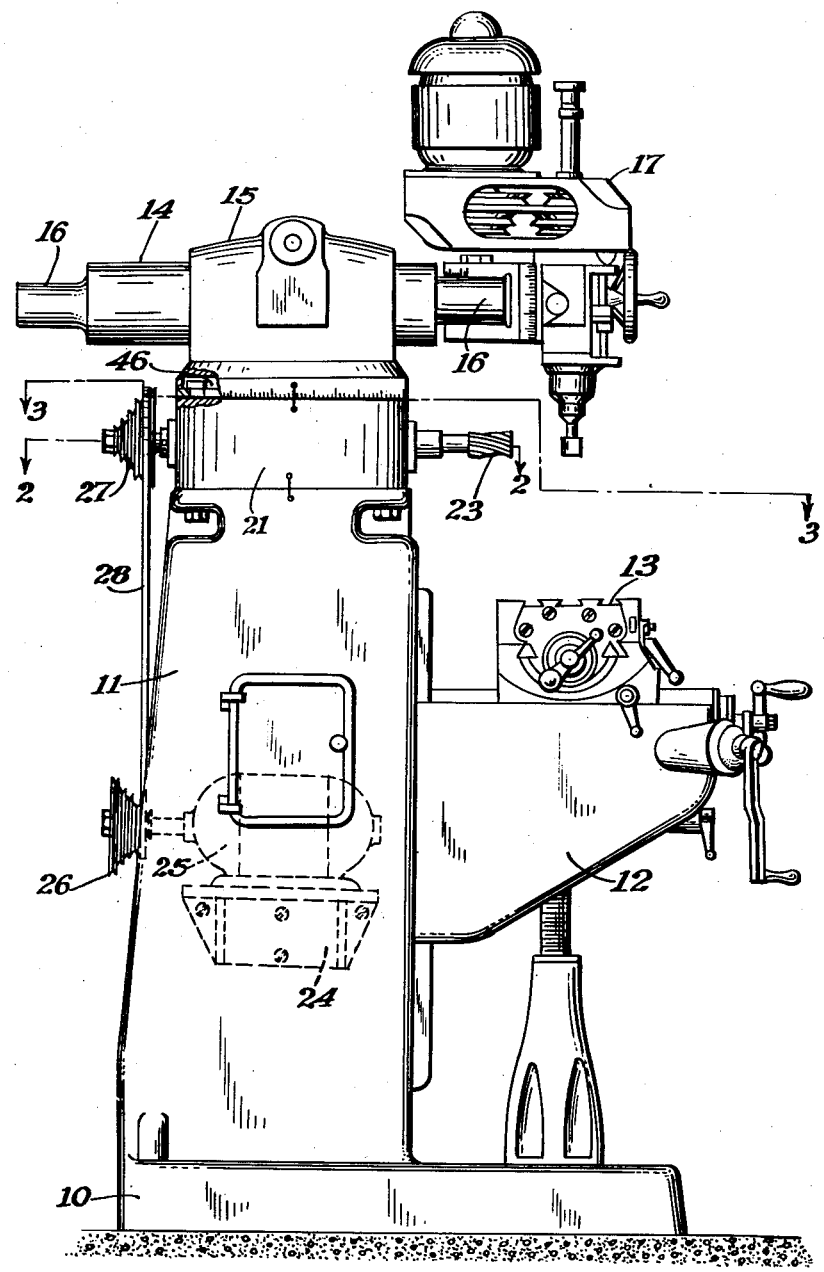
Fig. 1 is an elevation of a milling machine incorporating the invention.

By way of example, the invention is illustrated herein as incorporated in a vertical-spindle milling machine of known type disclosed in U. S. Patent No. 2,275,291 issued March 3, 1942 to R. F. Bannow. This machine comprises the usual base 10, column 11, knee 12, and work table 13, and an arm 14 rotatable about a horizontal axis within a head 15 which may be mounted on top of the pedestal 11 for rotation about a vertical axis. The ends 16 of the arm are milled with upper and lower flat surfaces and are adapted for the mounting of a vertical-spindle milling device 17 or other machine tool attachments.

Figure 3:
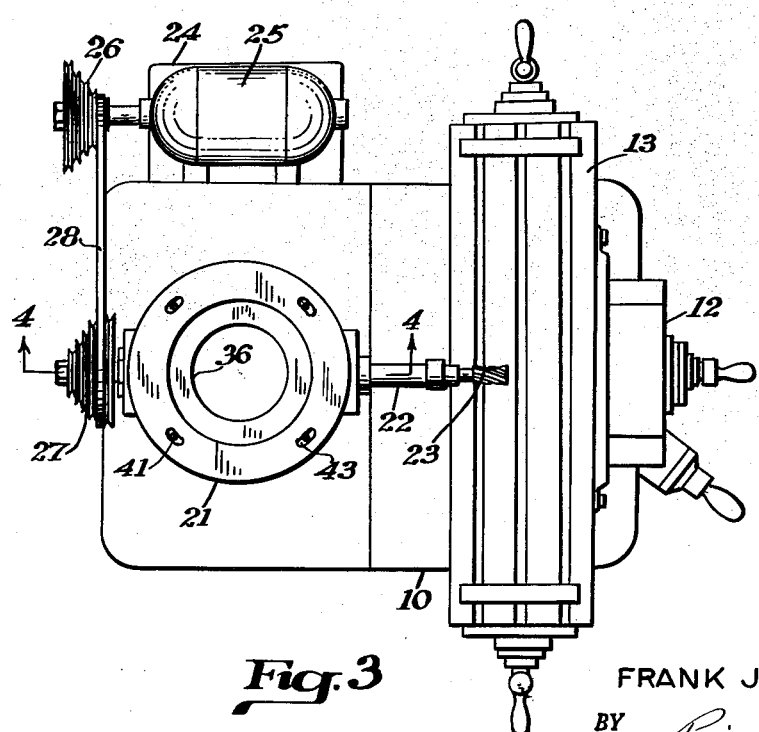
Fig. 3 is a horizontal section of the milling machine taken on the plane indicated by the line 3—3 in Fig. 1.

In order to increase the height of the head of the milling machine and thus adapt it for operations on unusually large work pieces, it has been known to provide a raising block fitted between the column and the head. This invention contemplates the provision of a bolster which may be installed in the machine in the same manner as the usual raising block and which is provided with a horizontal spindle which may be employed for milling, drilling or other machining operations. The invention also involves the installation of an auxiliary motor to furnish power to the horizontal spindle. More specifically, referring to Figs. 1 and 3, a bolster 21 is adapted for mounting on the column 11 in place of the head 15, the head then being mounted on the bolster. A horizontal spindle 22 mounted in antifriction bearings in the bolster is formed for the reception of the milling cutter or other tool 23 projecting above the work table 13. A bracket 24 bolted or otherwise secured to the column supports a motor 25 provided with a multiple-step V-belt pulley 26 which drives a similar pulley 27 on the horizontal spindle by means of a belt 28.

Figure 2:
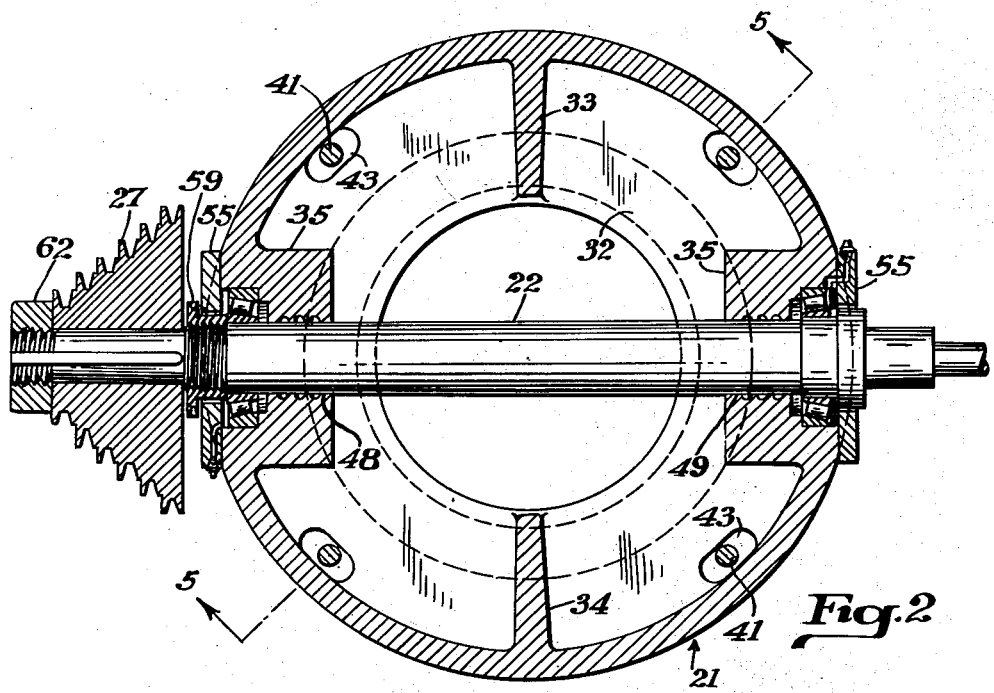
Fig. 2 is a horizontal section of the raising block and spindle taken on the plane indicated by the line 2—2 in Fig. 1.

The details of the invention are shown more particularly in Figs. 2, 4, and 5. The bolster 21, which may be a machined casting, is of cylindrical form with inwardly directed upper and lower flanges 31 and 32, respectively, for engagement with the head and pedestal. The bolster is strengthened by internal ribs 33 and 34 and by thicker wall sections 35 which serve to receive the spindle bearings as well as to strengthen the bolster.

The size of the bolster and the conformation of the upper and lower faces may, of course, be adapted to the construction of any particular machine in which it is to be used. Specifically, for the type of milling machine disclosed herein, the upper and lower faces of the block are machined with plane parallel surfaces and the inner edge 36 of the flange 31 is bored to fit a pilot bearing 37 of the head. The lower flange 32 is formed with a depending pilot bearing 38 machined for rotative engagement within the central bore 39 of the top of the column. The head and bolster are retained on the column by holding-down bolts 41, the heads of which are received in a circular T-slot 42 in the milling machine head and which pass through openings 43 in the flanges of the bolster and holes 44 provided for that purpose in the top of the milling machine column. The bolts may be fitted into the T-slot by virtue of an inwardly directed opening thereof 46 (Fig. 1) to replace the shorter holding bolts customarily employed when the bolster block is omitted.

Proceeding to the spindle and its mounting (Figs. 2 and 4) the spindle 22 is in the form of a hollow tube, the bore 46 of which is enlarged at one end to provide a conventional taper socket 47 for the reception of a tool shank or collet. The spindle is mounted within a clearance hole 49 in the portions 35 of the bolster block wall, and may be supported in any conventional manner, preferably by tapered roller bearings. One form of mounting illustrated herein involves two tapered roller bearings 51 (Fig. 4), the outer races of which are pressed into counterbores 52. The inner race of the inboard bearing bears against a washer 53 fitted against a flange 57 at the end of the spindle. The inner race of the outboard bearing is retained by a threaded collar 59, by means of which the bearing clearances may be adjusted. The multiple pulley 27, which may be of conventional construction and be keyed to the shaft 22 in the usual manner, is held in place by a nut 62 which compresses it against a shoulder 63.

Rings 55 retained by screws 56 shield the bearings against foreign matter. Any conventional means for lubricating the bearings may be provided.

The bolster is provided with an index 64 (Fig. 4) cooperating with the scale 65 on the head and may be provided with a similar index 66 to insure alignment of the spindle 22 transversely of the work table when the block 21 is installed on the column.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In a machine tool, in combination, a base comprising a columnar member having a vertical axis and an upper surface thereof defining a plane of rotation normal to said axis, a spindle block mounted for rotation on said upper surface and including a lower surface for engaging said upper surface, complementary annular projection and recess means on said block and said base member for constraining the block to rotate about the vertical axis relative to said base member, and the block having an upper surface defining a plane of rotation normal to the vertical axis of the base member, a work head mounted on said spindle block and having a lower surface engaging the upper surface of a spindle block, the spindle block being rotatable with respect to said work head, the spindle block and work head including complementary annular projection and recess means for constraining the work head to rotate about the vertical axis of the base member, said work head having a first spindle and a first driving motor connected to said first spindle for driving said spindle, a second spindle extending diametrically through the spindle block and mounted for rotation therein, and a second drive motor connected to said second spindle for driving said spindle.

2. In a machine tool, in combination, a base comprising a columnar member having a vertical axis and an upper surface thereof defining a plane of rotation normal to said axis, a spindle block mounted for rotation on said upper surface and including a lower surface for engaging said upper surface, complementary annular projection and recess means on said block and said base member for constraining the block to rotate about the vertical axis relative to said base member, and the block having an upper surface defining a plane of rotation normal to the vertical axis of the base member, a work head mounted on said spindle block and having a lower surface engaging the upper surface of a spindle block, the spindle block being rotatable with respect to said work head, the spindle block and work head including complementary annular projection and recess means for constraining the work head to rotate about the vertical axis of the base member, said work head having a first spindle and a first driving motor connected to said first spindle for driving said spindle, means extending between said base member and said work member for constraining said work head relative to said base member, a second spindle extending diametrically through the spindle block and mounted for rotation therein, and a second drive motor connected to said second spindle for driving said spindle.

3. In a machine tool, in combination, a base comprising a columnar member having a vertical axis and an upper surface thereof defining a plane of rotation normal to said axis, a spindle block mounted for rotation on said upper surface and including a lower surface for engaging said upper surface, complementary annular projection and recess means on said block and said base member for constraining the block to rotate about the vertical axis relative to said base member, and the block having an upper surface defining a plane of rotation normal to the vertical axis of the base member, a work head mounted on said spindle block and having a lower surface engaging the upper surface of a spindle block, the spindle block being rotatable with respect to said work head, the spindle block and work head including complementary annular projection and recess means for constraining the work head to rotate about the vertical axis of the base member, means extending through said spindle block between said base member and said work head for constraining said work head relative to said base member, and openings in said block member for passage of said constraining means to permit rotation of the spindle block.

FRANK J. MALNAR.

REFERENCES CITED

The following references are of record in the file of this patent:

UNITED STATES PATENTS

| Number | Name | Date |
| --- | --- | --- |
| 1,327,604 | Booth | Jan. 6, 1920 |
| 2,275,291 | Bannow | Mar. 3, 1942 |

FOREIGN PATENTS

| Number | Country | Date |
| --- | --- | --- |
| 99,186 | France | May 9, 1873 |
| 665,218 | Germany | Sept. 20, 1938 |